April 20, 1954     O. A. HANSEN     2,676,127

METHOD OF MAKING A NONPOROUS DUCT

Filed May 8, 1951

INVENTOR:
Otto A. Hansen

By Herbert E. Metcalf

HIS PATENT ATTORNEY

Patented Apr. 20, 1954

2,676,127

UNITED STATES PATENT OFFICE 2,676,127

METHOD OF MAKING A NONPOROUS DUCT

Otto A. Hansen, Venice, Calif., assignor to Northrop Aircraft, Inc., Hawthorne, Calif., a corporation of California Application May 8, 1951, Serial No. 225,166

2 Claims. (Cl. 154—83)

The present invention relates to ducts, and more particularly to a non-porous duct especially well suited for conveying hot air under pressure, and the method of making same.

Ducts, as ordinarily used in military aircraft for example, to convey hot air under pressure from a hot air source to other sections of the aircraft for deicing purposes, for example, must satisfy rigid U. S. A. F. specifications in strength, heat-resistance, weight, etc.

Hot air conveyed from jet engine compressor source in the aircraft for example, to the leading edges of the wings and tail assembly, must usually be supplied under pressure to insure complete circulation of the hot air through the deicing chambers. It is therefore very important that the pressure be maintained substantially constant; a factor difficult to achieve if the duct has any degree of porosity whatsoever. Hot air ducts manufactured from laminated layers of plasticized glass fabric alone for example, have been found to be unsuitable for the efficient transmission of hot air under pressure, because of porosity.

One of the chief objects of the present invention is to provide an improved non-porous plastic duct for conveying hot air, which will have among its advantages the ability to withstand heat up to 350° F. and safely convey hot air under pressure ranging up to 30 p. s. i. for example.

It is another object of the present invention to provide a method of making such a duct.

Briefly, the present invention in one preferred apparatus form comprises a tubular duct having a laminated wall comprising a layer of overlapping, spirally wound vulcanizable rubber-like non-porous tape, heat cured under pressure between layers of plastic impregnated glass fabric on a desired mold.

As to method, the present invention comprises the steps of applying uncured plastic impregnated glass fabric to a desired mold, following with a layer of overlapping elastic non-porous tape, and an outer layer of uncured plastic impregnated glass fabric, heat curing the molded materials under pressure and subsequently removing the finished product from the mold.

The present invention will be more clearly understood by referring to the specification drawings wherein:

Figure 1 is a cutaway view in perspective showing the installation of the hot air duct in the Northrop F-89 U. S. A. F. fighter aircraft.

Figure 1:
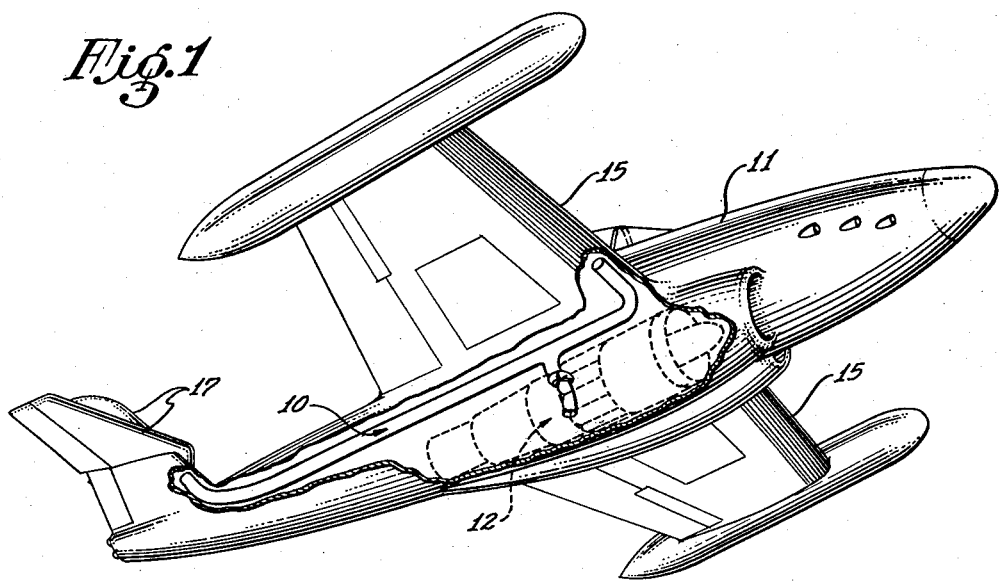

A hot air duct 10 is shown in Figure 1. In the present example, hot air is taken from a jet engine 12 and conveyed under pressure, on the order of 30 p. s. i., through the duct 10 to the leading edges of the wings 15 and tail assembly 17 for de-icing purposes.

Figure 2:
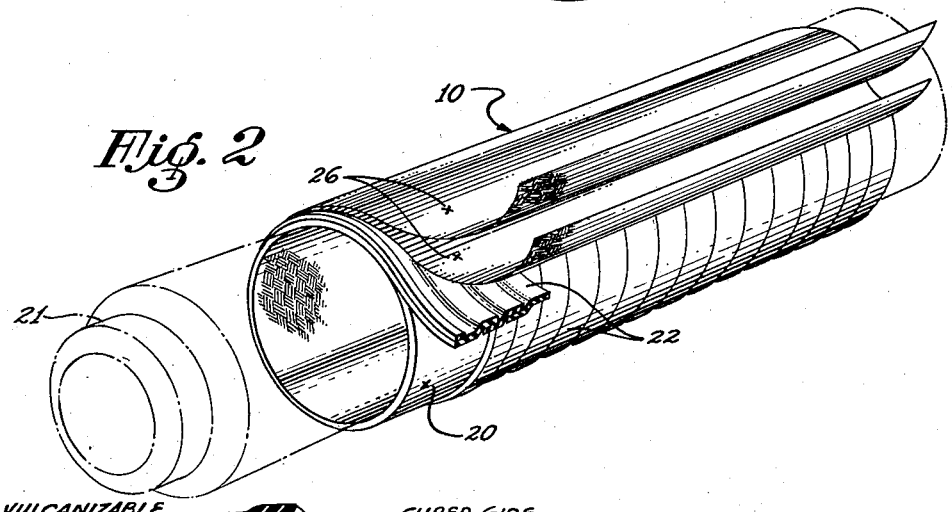
Figure 2 is a peel away view in perspective of a section of the duct showing the layers of materials as applied on the mold.

The method of fabricating the duct 10, as shown in Figure 2, preferably comprises first wrapping a layer of uncured phenolic resin impregnated glass fabric 20 around a desired form such as a plaster breakaway mold 21 for example. A non-porous tape 22 of rubber-like material—neoprene is very satisfactory— is then spirally wound around the first layer of fabric 20, each complete turn of the tape 22 preferably overlapping the preceding turn by at least one half the width thereof.

Figure 3:
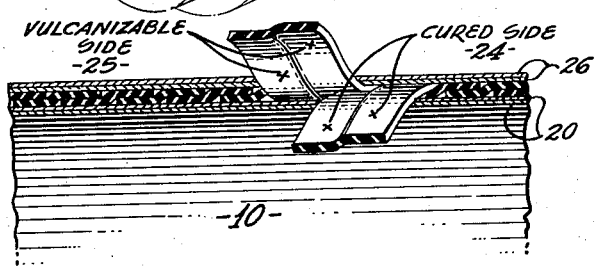
Figure 3 is an enlarged view of a longitudinal section of the duct wall.

The non-porous tape 22 as shown in Figure 3 preferably has one side 24 cured, the other side 25 being vulcanizable. In the present example, the vulcanizable side 25 is placed inwardly in contact with the first layer of fabric 20. Another layer 26 of uncured phenolic resin impregnated glass fabric is next wrapped around the first and second layers 20 and 22. As many additional layers of the plastic treated fabric as desired can be applied to the first and second layers 20 and 22 to achieve a desired strength, or as many layers of the impregnated fabric as desired may be used in the initial innermost wrap for the same reason.

After the wrapping procedure is completed, the molded materials can be heat-cured under pressure in a number of different ways. One well known method entails wrapping the formed duct unit with cellophane and heat-curing the unit thus wrapped, in a curing oven at about 325° F. The heat shrinks the cellophane, exerting pressure equally upon the entire external area of the duct during the baking process.

In another method the formed duct is sealed in a pliant plastic bag, of a polyvinyl alcohol material for example, which is then evacuated. In this manner the duct is subjected to atmospheric pressure which is exerted equally upon the total external area of the duct during the heat-curing process.

In still another method, the formed duct is subjected to positive mechanical pressure in a pre-heated die mold.

It is at once apparent that by vulcanizing the layer of overlapping non-porous tape interposed between the layers of plasticized glass fabric, that the resultant product of the present invention is a strong non-porous duct capable of withstanding temperatures up to 350° F., which is substantially durable, impervious to liquid corrosives, and highly shock-absorbent.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. The method of making a non-porous duct for conveying hot air under pressure, which comprises wrapping a first layer of uncured phenolic resin impregnated glass fabric around a desired form, spirally wrapping vulcanizable non-porous, neoprene tape around said first layer, each complete turn of said tape overlapping the preceding turn by at least one half the width thereof, wrapping an outer layer of uncured phenolic resin impregnated glass fabric around said spirally wrapped layer of non-porous tape, subjecting said layers of materials on said form to pressure, baking said materials under said pressure to cure said resin and vulcanize said neoprene tape, and removing said materials as a whole from said form.

2. The method of making a non-porous duct for conveying hot air under pressure, which comprises wrapping a first layer of uncured phenolic resin-treated glass fabric around a desired form, spirally wrapping an elastic non-porous tape around said first layer, said tape having one side vulcanizable, said vulcanizable side being placed inwardly and contacting said first layer, each complete turn of said tape overlapping the preceding turn by about one half the width of said tape, wrapping another layer of uncured phenolic resin-treated glass fabric around said spirally wrapped tape and said first layer, subjecting the fabric and tape materials to heat on the order of 325° F. under pressure, to form an integral laminated duct, and removing said duct from said form.

References Cited in the file of this patent

UNITED STATES PATENTS

| Number | Name | Date |
|---|---|---|
| 1,455,359 | Schulthess | May 15, 1923 |
| 2,468,493 | Greenwald | Apr. 26, 1949 |
| 2,525,070 | Greenwald et al. | Oct. 10, 1950 |
| 2,539,853 | Meyer et al. | Jan. 30, 1951 |
| 2,594,693 | Smith | Apr. 29, 1952 |

OTHER REFERENCES

Publication, Product Engineering, October 1947, pages 138–140.

Publication, Modern Plastics, August 1945, pp. 136–140.